United States Patent
Krappe

(10) Patent No.: US 9,672,200 B1
(45) Date of Patent: *Jun. 6, 2017

(54) SPREADSHEET WITH DYNAMIC CELL DIMENSIONS GENERATED BY A SPREADSHEET TEMPLATE BASED ON REMOTE APPLICATION VALUES

(71) Applicant: Apttus Inc, San Mateo, CA (US)

(72) Inventor: Kirk Krappe, Portola Valley, CA (US)

(73) Assignee: APTTEX CORPORATION, San Mateo, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 14/073,295

(22) Filed: Nov. 6, 2013

(51) Int. Cl.
H04L 29/06 (2006.01)
G06F 17/24 (2006.01)
G06F 21/60 (2013.01)

(52) U.S. Cl.
CPC ............ *G06F 17/246* (2013.01); *G06F 21/60* (2013.01)

(58) Field of Classification Search
CPC .............................. G06F 17/246; G06F 21/60
USPC .......................................................... 726/28
See application file for complete search history.

(56) References Cited

U.S. PATENT DOCUMENTS

| | | | | |
|---|---|---|---|---|
| 5,396,623 A * | 3/1995 | McCall | ............. | G06F 17/30952 |
| 5,555,409 A * | 9/1996 | Leenstra, Sr. | ..... | G06F 17/30958 |
| 5,742,813 A * | 4/1998 | Kavanagh | ............. | G06F 9/4448 |
| 5,835,910 A * | 11/1998 | Kavanagh | ............. | G06F 9/4448 |
| 6,292,810 B1 * | 9/2001 | Richards | ............... | G06F 17/246 707/999.1 |
| 6,988,241 B1 * | 1/2006 | Guttman | ............... | G06F 17/246 707/E17.115 |
| 7,107,519 B1 * | 9/2006 | Webster | ................ | G06F 17/246 715/212 |
| 8,370,464 B1 * | 2/2013 | Chitilian | ........... | H04L 29/08072 709/220 |
| 8,572,684 B1 * | 10/2013 | Sama | .................... | H04L 9/3228 726/2 |
| 8,812,625 B1 * | 8/2014 | Chitilian | ........... | H04L 29/08981 707/802 |
| 9,223,771 B2 * | 12/2015 | Lehrian | ................. | G06F 17/246 |
| 2003/0117447 A1 * | 6/2003 | Mujica | ................. | G06F 17/246 715/864 |
| 2003/0154183 A1 * | 8/2003 | Warren | ............. | G06F 17/30994 |
| 2003/0163779 A1 * | 8/2003 | Warren | ............. | G06F 17/30994 715/229 |
| 2004/0036715 A1 * | 2/2004 | Warren | ................. | G06F 9/4446 715/713 |
| 2004/0036718 A1 * | 2/2004 | Warren | ............. | G06F 17/30994 715/744 |

(Continued)

*Primary Examiner* — David Garcia Cervetti
(74) *Attorney, Agent, or Firm* — HM Law Group LLP; Vani Moodley, Esq.

(57) ABSTRACT

A method for generating a spreadsheet is disclosed. The method comprises locking a grid area comprising selected cells of the spreadsheet to prevent data entry into said cells by a user; performing an authentication operation to authenticate the user with a remote application; if the authentication operation authenticates the user then retrieving row and column header information from the remote application in response to said communication displaying said row and column header information from the remote application; and selectively unlocking cells of the grid area with row and column header information.

19 Claims, 12 Drawing Sheets

(56) References Cited

U.S. PATENT DOCUMENTS

| | | | | |
|---|---|---|---|---|
| 2004/0036722 A1* | 2/2004 | Warren | G06F 17/243 | 715/866 |
| 2004/0039989 A1* | 2/2004 | Warren | G06F 9/4443 | 715/262 |
| 2006/0010118 A1* | 1/2006 | Sattler | G06F 17/246 | |
| 2006/0010367 A1* | 1/2006 | Sattler | G06F 17/30991 | 715/209 |
| 2006/0080594 A1* | 4/2006 | Chavoustie | G06F 17/246 | 715/218 |
| 2006/0085738 A1* | 4/2006 | Chapus | G06F 17/2211 | 715/255 |
| 2006/0288267 A1* | 12/2006 | DeSpain | G06F 17/246 | 715/212 |
| 2007/0233811 A1* | 10/2007 | Rochelle | G06F 17/246 | 709/219 |
| 2008/0235596 A1* | 9/2008 | Bhogal | G06Q 10/10 | 715/743 |
| 2008/0243763 A1* | 10/2008 | Bishop | G06F 17/246 | |
| 2008/0250068 A1* | 10/2008 | Martyn | G06Q 10/10 | |
| 2008/0294903 A1* | 11/2008 | Miyazaki | G06F 21/64 | 713/176 |
| 2009/0158251 A1* | 6/2009 | Angrish | G06F 17/30914 | 717/115 |
| 2009/0172018 A1* | 7/2009 | Brochard | G06F 21/10 | |
| 2010/0083082 A1* | 4/2010 | Lehrian | G06F 17/245 | 715/212 |
| 2010/0169759 A1* | 7/2010 | Le Brazidec | G06Q 10/10 | 715/219 |
| 2010/0257439 A1* | 10/2010 | Xue | G06F 17/246 | 715/217 |
| 2010/0332973 A1* | 12/2010 | Kloiber | G06F 17/30011 | 715/255 |
| 2011/0016379 A1* | 1/2011 | McColl | G06F 17/246 | 715/219 |
| 2011/0041140 A1* | 2/2011 | Harm | G06F 9/4843 | 719/318 |
| 2011/0185305 A1* | 7/2011 | Lai | G06Q 30/08 | 715/772 |
| 2012/0131351 A1* | 5/2012 | Balinsky | H04L 9/0825 | 713/189 |
| 2012/0131645 A1* | 5/2012 | Harm | G06F 21/6218 | 726/4 |
| 2012/0179759 A1* | 7/2012 | Li | H04L 12/66 | 709/205 |
| 2012/0185759 A1* | 7/2012 | Balinsky | G06F 21/6227 | 715/209 |
| 2012/0192231 A1* | 7/2012 | Maa | G06F 3/0219 | 725/38 |
| 2012/0303968 A1* | 11/2012 | Balinsky | H04L 9/14 | 713/189 |
| 2013/0086064 A1* | 4/2013 | Salch | G06F 17/246 | 707/736 |
| 2013/0191650 A1* | 7/2013 | Balakrishnan | G06F 21/6227 | 713/190 |
| 2013/0246813 A1* | 9/2013 | Mori | G06F 17/30289 | 713/193 |
| 2013/0262975 A1* | 10/2013 | Rochelle | G06F 17/246 | 715/220 |
| 2013/0275401 A1* | 10/2013 | Auger | G06F 17/30011 | 707/704 |
| 2014/0136937 A1* | 5/2014 | Patel | G06F 17/246 | 715/212 |
| 2014/0157098 A1* | 6/2014 | Maresca | G06Q 10/101 | 715/219 |
| 2014/0282826 A1* | 9/2014 | Bastide | G06F 17/30011 | 726/1 |
| 2015/0039901 A1* | 2/2015 | Freeman | G06F 21/6227 | 713/189 |
| 2016/0210278 A1* | 7/2016 | Lehrian | G06F 17/246 | |

* cited by examiner

FISCAL PERIODS TABLE  500

| Fiscal Year | Fiscal Period | Fiscal Period Description |
|---|---|---|
| FY13 | FY1301 | FY 13 Jan |
| FY13 | FY1302 | FY 13 Feb |
| ... | | |

*FIG. 5*

ORGANIZATION UNIT TABLE

| Org Id | Org Description | Org Parent |
|---|---|---|
| 1 | All Functions | NA |
| 2 | Marketing | All Functions |
| 3 | Sales | All Functions |
| 4 | Global | NA |
| 5 | Europe | Global |
| 6 | UK | Europe |

GENERAL LEDGER ACCOUNTS TABLE

| Account | Natural Description | Org Unit | Acct Description |
|---|---|---|---|
| 5000 | Expenses | All Functions | Expenses |
| 5100-02-06 | Entertainment | Marketing/UK | Entertainment – Marketing - UK |
| 5101-02-06 | Campaigns | Marketing/UK | Campaigns – Marketing - UK |
| 5102-02-06 | Events | Marketing/UK | Events – Marketing - UK |
| 5110-02-06 | Salaries | Marketing/UK | Salaries – Marketing – UK |
| 5111-02-06 | Advertising | Marketing/UK | Advertising – Marketing – UK |
| 5100-03-06 | Sales/UK | Sales/UK | Entertainment – Sales – UK |
| 5101-03-06 | Sales/UK | Sales/UK | Campaigns – Sales – UK |

*FIG. 8*

| 1 | A | B | C | D | E | F | G |
|---|---|---|---|---|---|---|---|
| 1 | | Fiscal Periods | FY13 Jan | FY13 Feb | FY13 Mar | FY13 Apr | FY13 May |
| 2 | Account | | | | | | |
| 3 | Entertainment | | | | | | |
| 4 | Campaigns | | | | | | |
| 5 | Events | | | | | | |
| 6 | Salaries | | | | | | |
| 7 | Advertisiing | | | | | | |
| 8 | Total | | | | | | |

Table Specifying Dimension Range Behavior                                        1000

| Data Area | Filter By | Start of Dimension Range | Repeat | Based on Table | Display | Order By |
|---|---|---|---|---|---|---|
| Account | Org Unit | B6 | Down | GL Accounts | Natural Description | Account |
| Fiscal Periods | Fiscal year | C4 | Right | Fiscal Periods | Fiscal Period Description | Fiscal Period |

*FIG. 10*

SPREADSHEET WITH DYNAMIC CELL DIMENSIONS GENERATED BY A SPREADSHEET TEMPLATE BASED ON REMOTE APPLICATION VALUES

FIELD

Embodiments of the present invention relate to spreadsheets. In particular, embodiments of the present invention relate to templates for spreadsheets.

BACKGROUND

Spreadsheets may be used for organization and analysis of data in tabular form. Within a spreadsheet, data is represented as cells of an array, organized in rows and columns. For example in the case of a budget, each column may be used to represent a fiscal period, whereas each row may be used to represent an account.

Within an organization/enterprise spreadsheet templates, e.g. with predefined cell ranges and formulas, may be used to save time.

SUMMARY

According to a first aspect of the invention, there is provided a method for generating a spreadsheet. The method comprises locking a grid area comprising selected cells of the spreadsheet to prevent data entry into said cells by a user; performing an authentication operation to authenticate the user with a remote application; if the authentication operation authenticates the user then retrieving row and column header information from the remote application in response to said communication displaying said row and column header information from the remote application; and selectively unlocking cells of the grid area with row and column header information.

Other aspects of the invention will be apparent from the detailed description below.

BRIEF DESCRIPTION OF THE FIGURES

FIGS. 5-8 show tables provisioned in an enterprise budgeting application, in accordance with one embodiment of the invention.

FIG. 10 shows a table specifying dimension range behavior, in accordance with one embodiment of the invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
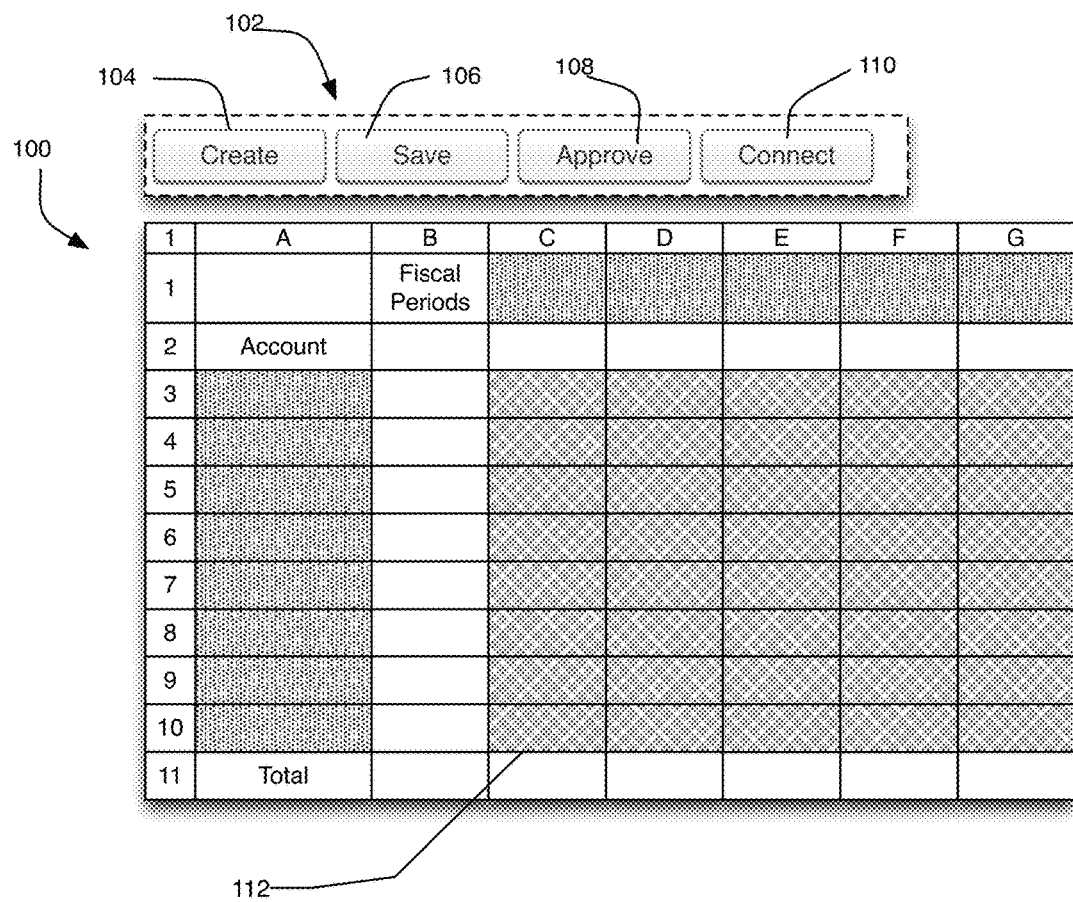
FIG. 1 spreadsheet generated by a spreadsheet template, in accordance with one embodiment of the invention.

In one embodiment, there is provided a spreadsheet template to generate a spreadsheet 100 as shown in FIG. 1. The spreadsheet 100 is designed to facilitate the capture of budget data for an enterprise, and includes columns labeled A-G and rows labeled 1-12. It is to be noted that the spreadsheet 100 in not limited to facilitate capturing budget data and may be used to capture data for other purposes. Moreover, it is to be noted that the particular number of rows and columns in the template were selected for illustrative purposes only and may change depending on the application.

In the case of the spreadsheet 100, the columns represent Fiscal Periods for a budget, whereas the rows represent Accounts for the budget. Header information pertaining to the rows and columns of the spreadsheet application (here budgeting) are referred to herein as dimensions. Advantageously, said dimensions are generated dynamically through a connection with remote application, as will be explained.

The spreadsheet 100 includes a menu area 102. In one embodiment, in addition to the standard spreadsheet buttons found in spreadsheets (e.g. buttons for opening a file, creating a file, saving a file etc.) with, the menu area 102 includes a "create" button 104, a "save" button 106, an "approve" button 108, and a "connect" button 110. The operation of these additional buttons will be explained in greater detail below. The spreadsheet 100 also includes a grid area 112 to capture input budget data.

Figure 2:
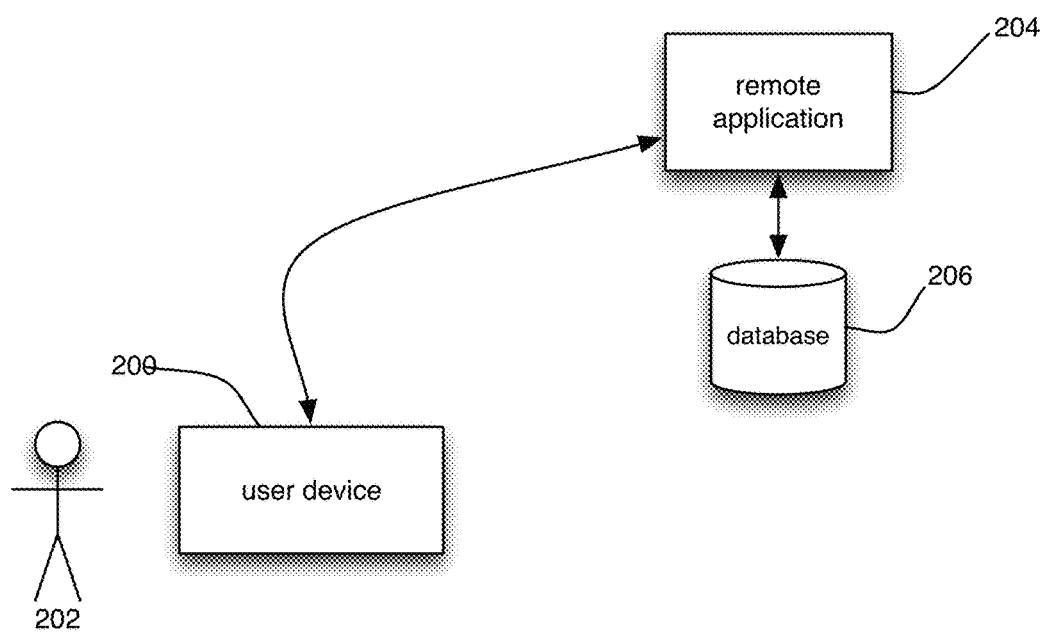
FIG. 2 shows user device running the spreadsheet template of FIG. 1 and connecting to a remote application, in accordance with one embodiment of the invention.

In use, the spreadsheet 100 is opened in a spreadsheet program running on a user device 200 shown in FIG. 2. The user device 200 may include any computing device capable of running a spreadsheet program e.g. Microsoft Excel. For example, the user device may be a desktop/notebook computer, smartphone, or tablet. The user device is under control of a user 202.

Figure 3:
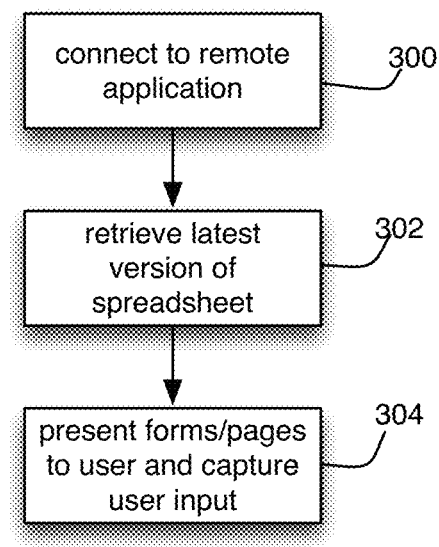
FIGS. 3-4 show flowcharts of actions by the spreadsheet template, in accordance with one embodiment of the invention.

In one embodiment, under control of the user 202 the spreadsheet 100 may be used to perform the actions shown in FIG. 3 of the drawings. Referring to FIG. 3, at block 300, the spreadsheet 100 connects to the remote application 204 (see FIG. 2). In the present case, the remote application 204 is a budgeting application, which is communicatively coupled with a database 206. In one embodiment, to initiate the connection with the remote application 204, the user 202 selects the connect button 110. In one embodiment, the connection with the remote application 204 may be via a wide area network (WAN), such as the Internet. As part of the block 300, the spreadsheet 100 performs an authentication operation with the remote application 204 to authenticate the user 202. For example, to authenticate the user 202, the spreadsheet 100 may send user-identifying information in the form of login credentials of the user 200, e.g. single sign on or otherwise to the remote application 202.

At block 302, the spreadsheet 100 retrieves its latest template version from the remote application 202. In some embodiments, the step 302 is optional. Responsive to successful connection and authentication with the remote application 202, in one embodiment, the create button 104 which was previously not selectable (i.e. it was greyed out) becomes available for selection.

Figure 4:
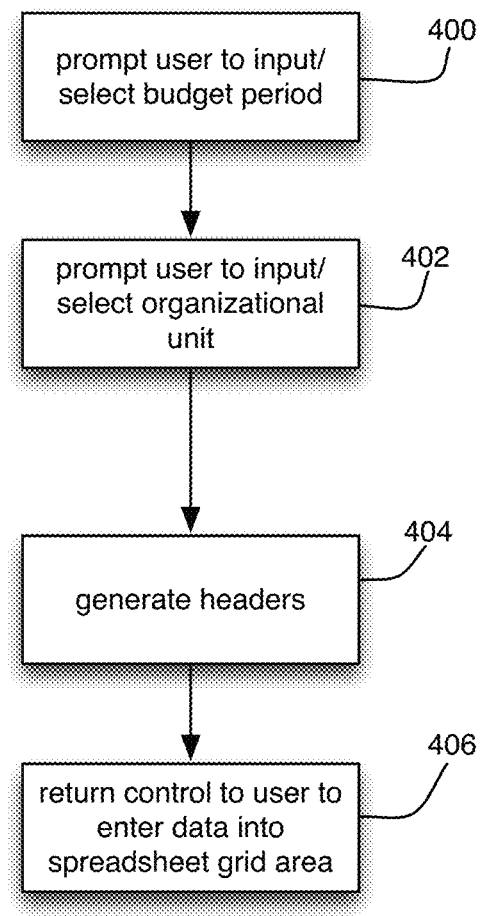

The user 202 selects the create button 104 and responsive thereto, in one embodiment, one or more input pages/forms may be displayed to the user 200. It is to be noted that the spreadsheet 100 may include labels, formulas and/or other values that are independent of the remote application 202. In one embodiment, the forms are designed to capture inputs from the user 200 to facilitate creation of the dimensions for the spreadsheet. FIG. 4 shows the operations performed by the spreadsheet 100 to capture said inputs (the inputs are also referred to herein as "spreadsheet configuration" information), in one embodiment. Referring to FIG. 4, at block 400 the user 200 is prompted to select or input a budget period. For this purpose a list of active budget periods may be displayed to the 200 for selection. At block 402, the user 200 is prompted for input or selection of an organization unit. For selection, a list of organization units may be presented to the user 200. In one embodiment, filters may be provided to allow the user 200 to filter said list. Upon completion of the inputs via the forms, the spreadsheet 100 formulates a query based on the inputs. In one embodiment, the spreadsheet 100 is configured to transmit the query to remote application 202 in order to retrieve appropriate row and column header information from the remote application. The block 404 in FIG. 4 indicates this. The grid area 112 shown in cross-hatching in FIG. 1 is then unlocked, i.e. it becomes active. This corresponds to the block 406 in FIG. 4. Thus, the user 200 may input values into the grid area 112.

Once the values have been input into the grid area 112, the user may activate the save button 106. This action causes the spreadsheet 100 to send the user-input budget data to the enterprise application 202.

Figure 6:
Figure 7:
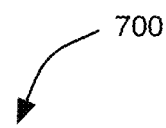
Figure 9:
FIG. 9 shows a spreadsheet generated by a spreadsheet template, in accordance with one embodiment of the invention.

For better understanding of the operations of the spreadsheet 100, consider that the remote application 202 includes a fiscal period table, a budget master table, an organization unit table and a general ledger (GL) table. FIG. 5 shows an example of a fiscal period table 500, FIG. 6 shows an example a budget master table 600, FIG. 7 shows an example an organization unit table 700, and FIG. 8 shows an example a general ledger (GL) table 800. FIG. 9 shows a spreadsheet 900 generated by the inventive template in accordance with the techniques described above.

In order to generate a spreadsheet 900 based on the inventive template, the user 200 inputs "FY 13" as the Fiscal Period and "Marketing/UK" as the Organization Unit, when prompted to do so by the template as described above. Using these inputs, dimension ranges are created corresponding to the headers "Fiscal Periods" and "Account". In one embodiment, a dimension range marks a spreadsheet cell as the dimension's starting cell corresponding to a range of cells and applies a behavior pattern e.g. vertical, so that cells are populated vertically with each retrieved remote application record being a new cell in that dimension range. To correctly generate the Fiscal Year and Account dimensions in the spreadsheet 900 a table specifying dimension range behavior is used, in one embodiment. Such a table 1000 is shown in FIG. 10. As will be seen, the table shows that the dimension/data area "Account" starts at cell B6 and is repeated in a vertical direction, whereas the dimension/data area "Fiscal Periods" starts at the cell C4 and is repeated in a horizontal direction.

Figure 11:
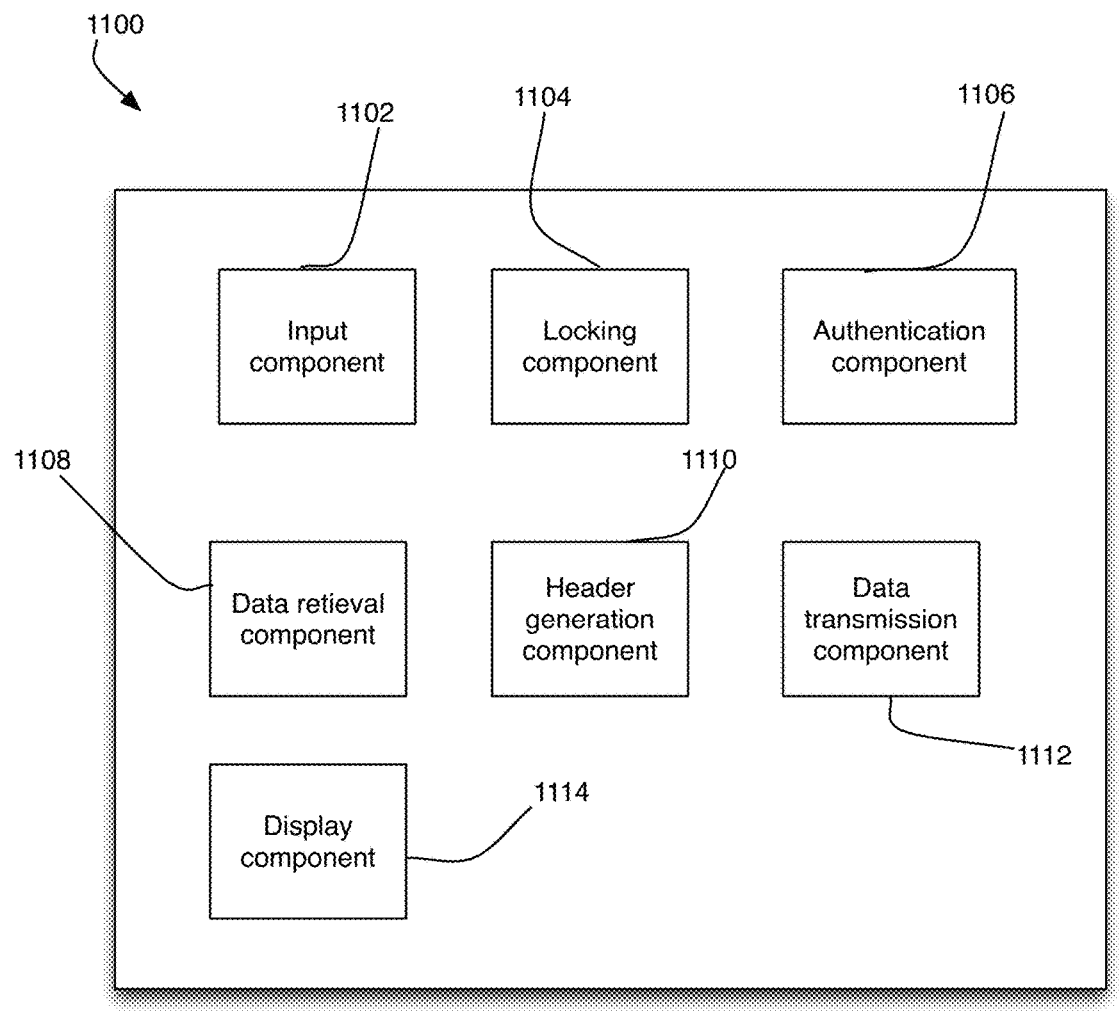
FIG. 11 shows logical view of the spreadsheet template, in accordance with one embodiment of the invention

In one embodiment the template disclosed herein may be implemented as software 1100 which may include the components shown in FIG. 11, at least at a logical level. As will be seen, to implement the techniques and function disclosed herein the software includes the following components:

Input component 1102: this component facilitates the capture of user inputs.

Locking component 1104: this component locks the grid area until the headers have been generated.

Authentication component 1106: this component authenticates the user to the remote application.

Data Retrieval component 1108: this component formulates a query based on the user inputs and retrieves data based on the query from the remote application 202.

Header generation component 1110: this component generates the row and column headers based on header information received from the remote application.

Data transmission component 1112: this component is responsible for sending and receiving data to and from the remote application Display component 1114: this component is responsible for displaying the spreadsheet and other information.

Figure 12:
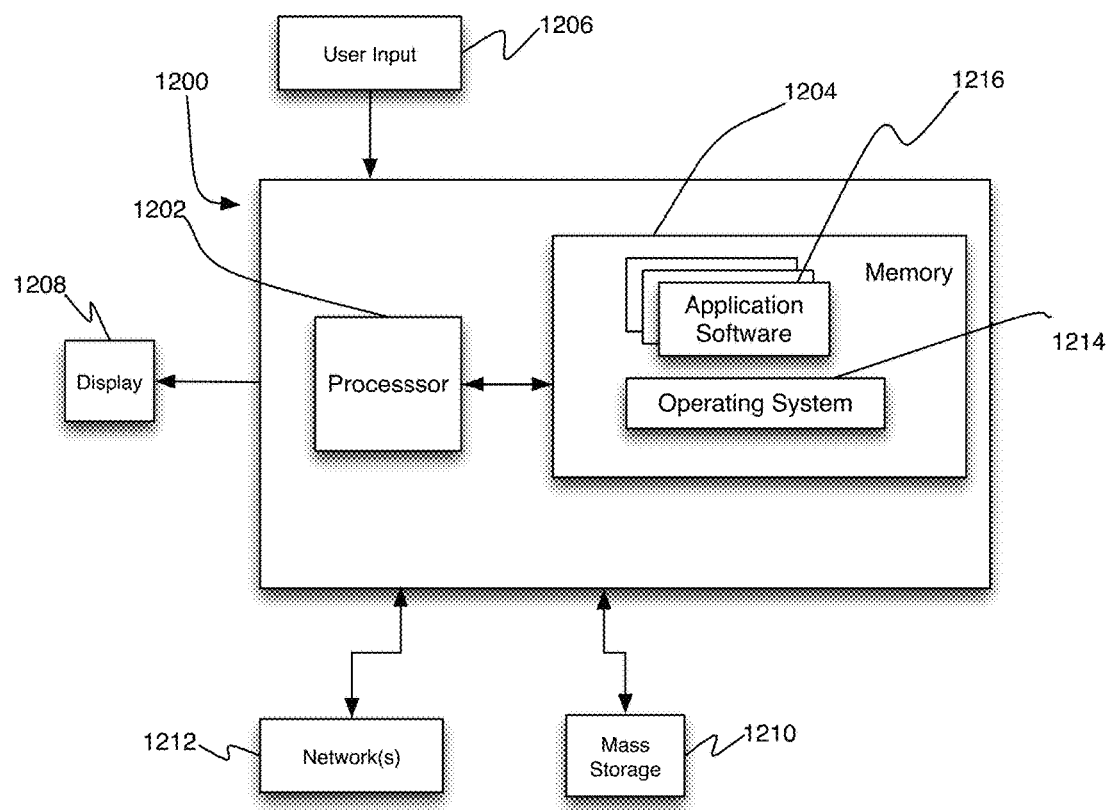
FIG. 12 shows a high-level block diagram of a system that implements the spreadsheet template, in accordance with one embodiment of the invention

FIG. 12 shows a system 1200, in accordance with one embodiment the implements the template disclosed herein. The system 1200 may includes at least one processor 1202 coupled to a memory 1204. The processor 1202 may represent one or more processors (e.g., microprocessors), and the memory 1204 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 1204 may be considered to include memory storage physically located elsewhere in the hardware, e.g. any cache memory in the processor 1202, as well as any storage capacity used as a virtual memory, e.g., as stored on a mass storage device.

The system also typically receives a number of inputs and outputs for communicating information externally. For interface with a user or operator, the hardware may include one or more user input/output devices 1206 (e.g. keyboard, mouse, etc.) and a display 1208. For additional storage, the system 1200 may also include one or more mass storage devices 1210, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 1212 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 1202 and each of the components, as is well known in the art.

The system 1200 operates under the control of an operating system 1214, and executes application software 1216 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for a spreadsheet program, comprising:
capturing user inputs for dimensions of a spreadsheet;
initiating a connection to a remote application for transmitting user information and the user inputs for the dimensions of the spreadsheet to the remote application;
receiving, in response to the initiated connection, header information from the remote application wherein the header information was generated dynamically by the remote application based on the user inputs for the dimensions of the spreadsheet; and
creating the spreadsheet comprising generating a row header and a column header for the spreadsheet based on the header information.

2. The method of claim 1, wherein the user information comprises information to identify a user, for whom the spreadsheet is to be created, to the remote application.

3. The of method of claim 2, wherein the user information further comprises input captured from the user, the input to facilitate generation of a header.

4. The method of claim 3, further comprising prompting the user for the input by displaying a list of options for the input, which correspond to tables of the remote application.

5. The method of claim 1, further comprising locking selected cells of the spreadsheet to prevent input into the cells until the row header and the column header for the cells have been generated.

6. The method of claim 5, farther comprising transmitting information input into the selected cells, when unlocked, to the remote application.

7. A method for a spreadsheet program, comprising:
locking a grid area comprising a selection of cells to prevent data entry into the cells by a user;
performing an authentication operation to authenticate the user with a remote application;
if the authentication, operation authenticates the user then:
retrieving row and column header information from the remote application;
generating a spreadsheet comprising the row and column header information from the remote application; and
selectively unlocking cells of the grid area with row and column header information.

8. The method of claim 7, wherein the row and column header information is retrieved by the remote application based on identifying information for the user.

9. The method of claim 7, further comprising prompting the user to input spreadsheet configuration information; and communicating the spreadsheet configuration information to the remote application.

10. The method of claim 9, wherein the row and column header information is retrieved by the remote application based on the spreadsheet configuration information.

11. The method of claim 7, further comprising capturing input data from the user; and transmitting same to the remote application.

12. The method of claim 11, wherein the row and column header information is retrieved by the remote application responsive to a query based on input data.

13. A non-transitory computer-readable storage medium, having stored thereon, a sequence of computer-executable instructions which causes a computer to perform a method, comprising:
locking a grid area comprising a selection of cells to prevent data entry into the cells by a user;
performing an authentication operation to authenticate the user with a remote application, wherein
if the authentication operation authenticates the user then:
prompting the user to input spreadsheet configuration information,
communicating the spreadsheet configuration information to the remote application,
retrieving row and column header information from the remote application in response to the communication;
generating a spreadsheet comprising the row and column header information from the remote application; and
selectively unlocking cells of the grid area with the row and column header information.

14. The non-transitory computer-readable storage medium of claim 13, wherein the row and column header information is retrieved by the remote application based on identifying information for the user.

15. The non-transitory computer-readable storage medium of claim 13, wherein the method further comprises prompting the user to input spreadsheet configuration information; and communicating the spreadsheet configuration information to the remote application; wherein the row and column header information is retrieved by the remote application based on the spreadsheet configuration information.

16. A system, comprising:
a processor; and a memory coupled to the processor, the memory storing instructions which when executed by the system causes the system to perform a method, comprising:

locking a grid area comprising a selection of cells to prevent data entry into the cells by a user;

performing an authentication operation to authenticate the user with a remote application;

if the authentication operation authenticates the user then:

retrieving row and column header information from the remote application in response to the communication;

generating spreadsheet comprising the row and column header information from the remote application; and selectively unlocking cells of the grid area with row and column header information.

17. The system of claim 16, wherein the row and column header information retrieved by the remote application based on identifying information for the user.

18. The system of claim 16, wherein the method further comprises prompting the user to input spreadsheet configuration information; and communicating the spreadsheet configuration information to the remote application.

19. The system of claim 18, wherein the row and column header information is retrieved by the remote application based on the spreadsheet configuration information.

* * * * *